United States Patent [19]
Edwards et al.

[11] Patent Number: 6,096,151
[45] Date of Patent: Aug. 1, 2000

[54] METHOD AND APPARATUS FOR MAKING ARTICLES HAVING BRISTLES

[75] Inventors: Mark Stephen Edwards; Jeffrey Allen Chambers, both of Hockessin, Del.

[73] Assignee: E. I. du Pont de Nemours and Company, Wilmington, Del.

[21] Appl. No.: 09/092,092

[22] Filed: Jun. 5, 1998

[51] Int. Cl.⁷ .............................. A46B 9/04; B32B 5/08; B32B 31/20
[52] U.S. Cl. .......................... 156/174; 156/73.1; 156/72; 156/173; 156/435
[58] Field of Search .................................. 156/173, 174, 156/175, 435, 72, 73.1, 73.2

[56] References Cited

U.S. PATENT DOCUMENTS

| | | |
|---|---|---|
| 1,296,067 | 3/1919 | Fuller . |
| 1,684,855 | 12/1928 | Acheson . |
| 2,475,019 | 7/1949 | Faris ........................................ 156/173 |
| 2,599,191 | 6/1952 | Meunier . |
| 2,786,508 | 3/1957 | Waage . |
| 2,812,214 | 11/1957 | Sandelin . |
| 2,980,467 | 4/1961 | Lechene . |
| 3,216,038 | 11/1965 | Gould et al. . |
| 3,263,258 | 8/1966 | Burge . |
| 3,618,154 | 11/1971 | Muhler et al. ........................... 15/167.1 |
| 3,798,699 | 3/1974 | Lewis, Jr. . |
| 4,030,845 | 6/1977 | Deckert . |
| 4,148,953 | 4/1979 | Horton . |
| 4,211,217 | 7/1980 | Gueret . |
| 4,325,900 | 4/1982 | Holding et al. . |
| 4,382,309 | 5/1983 | Collis ..................................... 15/167.1 |
| 4,406,032 | 9/1983 | Diamant . |
| 4,423,532 | 1/1984 | Yagi et al. . |
| 4,438,541 | 3/1984 | Jacob et al. . |
| 4,493,125 | 1/1985 | Collis . |
| 4,507,361 | 3/1985 | Twilley et al. . |
| 5,459,898 | 10/1995 | Bacolot . |
| 5,470,629 | 11/1995 | Mokhtar et al. . |
| 5,472,762 | 12/1995 | Edwards et al. . |
| 5,547,732 | 8/1996 | Edwards et al. ..................... 156/435 X |
| 5,682,911 | 11/1997 | Harada . |
| 5,804,008 | 9/1998 | Kennard et al. ..................... 156/174 X |

FOREIGN PATENT DOCUMENTS

| | | |
|---|---|---|
| 2541-100 | 8/1984 | France . |
| 4114136 | 11/1992 | Germany . |
| 19536775 | 4/1997 | Germany . |
| 19604559 | 8/1997 | Germany . |
| 1-236008 | 9/1989 | Japan . |
| 6-154030 | 6/1994 | Japan . |
| 1457074 | 12/1976 | United Kingdom . |
| WO 97/14830 | 4/1997 | WIPO . |
| WO 97/39651 | 10/1997 | WIPO . |
| WO 98/25500 | 6/1998 | WIPO . |
| WO 99/42019 | 8/1999 | WIPO . |

*Primary Examiner*—Jeff H. Aftergut

[57] ABSTRACT

Methods and apparatuses for making elongated articles are disclosed. One method includes feeding at least one base string along an axis, wrapping at least one monofilament around the axis to produce a number of monofilament wraps per length of base string which are transported by the base string, bonding the wraps to the base string with ultrasonic energy, and cutting the wraps at a point downstream of where the wraps are bonded to the base string. The result is an article having two rows of monofilament segments connected to the base string.

32 Claims, 10 Drawing Sheets

METHOD AND APPARATUS FOR MAKING ARTICLES HAVING BRISTLES

BACKGROUND OF THE INVENTION

The present invention relates generally to articles made of polymeric monofilaments, and more particularly, to methods for making brush bristles and bristle sub-assemblies, and apparatuses for making brush bristles and bristle sub-assemblies.

Brush making involves the attachment of bristles to a brush body. In one type of brush, known as the "solid block/staple set," a solid block acting as the brush body is drilled, molded, or otherwise worked to form an array of holes. Individual tufts are placed in individual holes and secured to the block by wire staples, plugs or other anchoring means. Hand drawn brushes are similar except that the tufts are secured by drawing them through the holes with an elongated strand.

Another type of brush employs a "ferrule and monofilaments" technique for attaching the bristles to the brush body. A cluster of monofilaments and cavity creating spacers are inserted into a ferrule and set with a binding resin. Ferrule brushes, such as the paint brush, are used to primarily apply liquid or viscous solutions.

In metal strip brushes, fibers are held in a "U" shaped channel of a metal strip by an anchoring wire, string, or monofilament. The channel is then crimped closed to mechanically clamp the proximal end portions of the monofilaments and anchor wire within the strip. Once formed, the brush-strips can be attached to brush bodies or otherwise shaped for specific applications.

Fused brushes are those in which polymeric tufts are fused directly to a brush body that is preferably made of the same material. One variation of fused brushes employs ultrasonic welding to secure polymeric fibers directly to a base.

With respect to the toothbrush, it is now commonplace to employ nylon monofilaments that are grouped together to form "bristle tufts." Each bristle tuft is typically arranged in a circular cluster, and a complete bristle head includes a matrix of bristle tufts arranged in rows or other patterns. The folded proximal bases of the bristle tufts are typically embedded and held in place by an anchor wire that extends across the field of the tufts and into the polymeric material that forms the head portion of the toothbrush body, while the distal ends extend upwardly therefrom, often terminating in a common plane. A more recent tufting method employs the process of cutting the tuft of monofilaments to the desired length, heat fusing the proximal ends and embedding the fused proximal ends into the polymeric material of the toothbrush head.

More recent innovations in the toothbrush art have included bristle tufts cut to provide differing lengths to provide an array of shorter and longer tufts to achieve a desired action on the user's teeth. In some tufts the monofilaments are of differing length. While these improvements can result in better functional aspects of the toothbrush, few innovations have been made over the years in techniques for manufacturing the toothbrush head; this is particularly evident in the manner in which bristles are assembled with the brush body.

In all types of known brushes, the assembly process can represent a substantial portion of the cost of manufacture since individual bristle filaments have to be held in a desired grouping and then bound to the brush body in a manner that ensures that the bristle filaments do not become detached during use. Also, recycling becomes more problematic for brushes which employ metal staples or other combinations of different classes of materials (plastics and metals, for example) in one structure. In general, the presently known techniques for forming monofilament bristle articles are not suitable for continuous feed, high through-put production, where labor requirements are relatively slight.

A machine for making pile articles useful in the field of floor coverings is described in U.S. Pat. No. 5,547,732 to Edwards et al. As seen in FIG. 1 herein, the Edwards et al. machine takes a continuous yarn 20, fed from a source 22 through a tensioner 24, and passes it through a hollow guide conduit 26 that is rotated about its center. The conduit 26 is bent to guide the yarn 20 to a position at 28 radially displaced from the center of rotation. A mandrel 30 is supported at the center of rotation and accepts the yarn 20 which is would around the mandrel 30 as it is fed from the conduit at 28.

A support strand 32 is fed into the mandrel 30 at 34 and through a passage 36 in the mandrel 30. The strand 32 exits the passage at 38 where it is guided to the outside of the mandrel 30 along ridge 40. The mandrel may have two, three, four or more such ridges where the yarn wrapping on the mandrel bends at an included angle between 0 and 180 degrees, preferably less than 90 degrees. The yarn 20 is wrapped over the strand 32 which is pulled along the mandrel 30 by a windup 41. Additional strands or yarn carriers, such as 42 and 44 propelled by motor driven pulley 46, are used to transport the yarn along the other ridges of the mandrel.

The yarn 20 is wrapped under some tension so it conforms to the mandrel 30 and is frictionally engaged with the strand and carriers for transporting before and after bonding. The wrapped yarn and strand travel together along the mandrel and under ultrasonic horn 48 where sufficient energy is imparted to the yarn that it is compacted, the multifilaments are fused together, and the yarn 20 is fused to the support strand 32. The mandrel ridge acts as an ultrasonic anvil surface. The wrapped yarn, now bonded to the strand, continues along the mandrel to cutter 50 which severs the yarn to define individual bundles of yarn having opposed ends with each bundle attached to the strand intermediate the ends.

In the aforementioned U.S. Pat. No. 5,547,732, the yarn 20 is described as a multifilament, crimped, bulky, plied-twisted yarn that has been heat set to retain the ply-twist. The yarn 20 is a thermoplastic polymer, such as nylon, polypropylene, etc. FIG. 2 shows a typical elongated pile article or tuftstring 52 made with the machine described with reference to FIG. 1. The tuftstring 52 includes a plurality of bundles of yarn 54 bent into "U" shape and attached to the support strand 32 at the inside of the "U." Each bundle defines a pair of upstanding legs or tufts 56 and 58. The tuftstrings have many advantages of manufacture in making floor coverings, and in particular, the machine produces continuous lengths of tuftstring at low cost, and with minimal labor.

SUMMARY OF THE INVENTION

An object of the present invention is to provide a method of making bristle articles and bristle sub-assemblies which lends itself to high productivity and low cost production.

Another object of the present invention is to provide a method of making bristle sub-assemblies which are capable of expanding brush design beyond the range possible with current tufting techniques.

Another object of the present invention is to provide a method of making a bristle sub-assembly for a brush in which individual filaments are positionally fixed with respect to each other prior to connection to a brush body.

Still another object of the present invention is to provide a method of making bristle sub-assemblies which can be permanently connected to the brush body or, alternatively, detachably connected for subsequent replacement, thereby avoiding wastefully discarding otherwise functional brush bodies.

These and other objects are met by providing a method for making an elongated bristle article which comprises the steps of feeding a base string along an axis, wrapping at least one monofilament around the axis, thereby producing a number of monofilament wraps per length of base string which are transported by the base string, bonding the wraps to the base string, and cutting the wraps at a point spaced from the bonding point to thereby form an article having two rows of monofilaments connected to the base string.

An apparatus for making continuous lengths of bristle articles of the present invention produces bristle sub-assemblies which include either a plurality of monofilament segments or monofilament loops connected to a base string, or combinations of loops and segments. Each monofilament or monofilament loop is connected transversely to the base string to form a pair of loop segments extending outwardly from opposite sides of the base string to form two rows of loop segments.

Other objects and features of the invention will become more apparent from the following detailed description when taken in conjunction with the illustrative embodiments in the accompanying drawings.

DETAILED DESCRIPTION OF THE PREFERRED EMBODIMENTS

Figure 1:
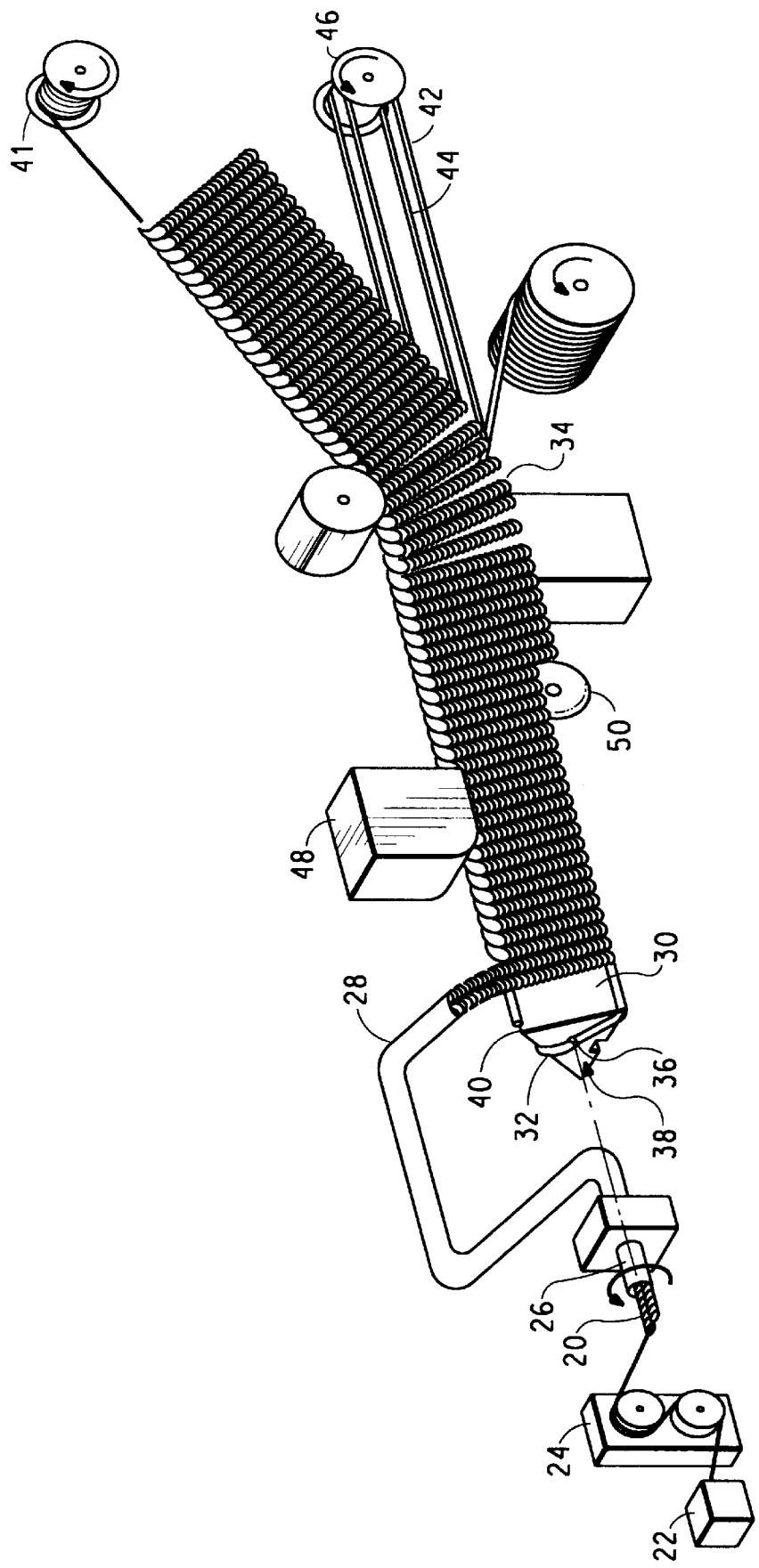
FIG. 1 is a schematic, perspective view of a known apparatus for making elongated pile articles useful in the art of making floor coverings.
Figure 2:
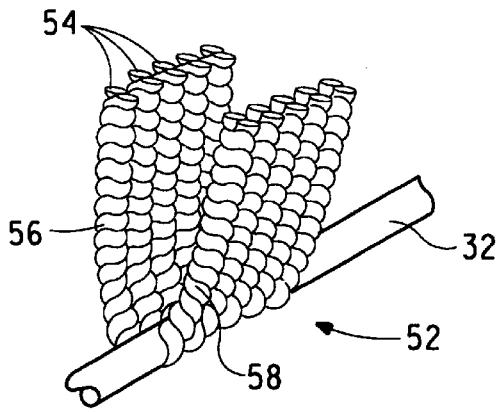
FIG. 2 is a perspective view of a pile article made with the apparatus of FIG. 1.
Figure 3:
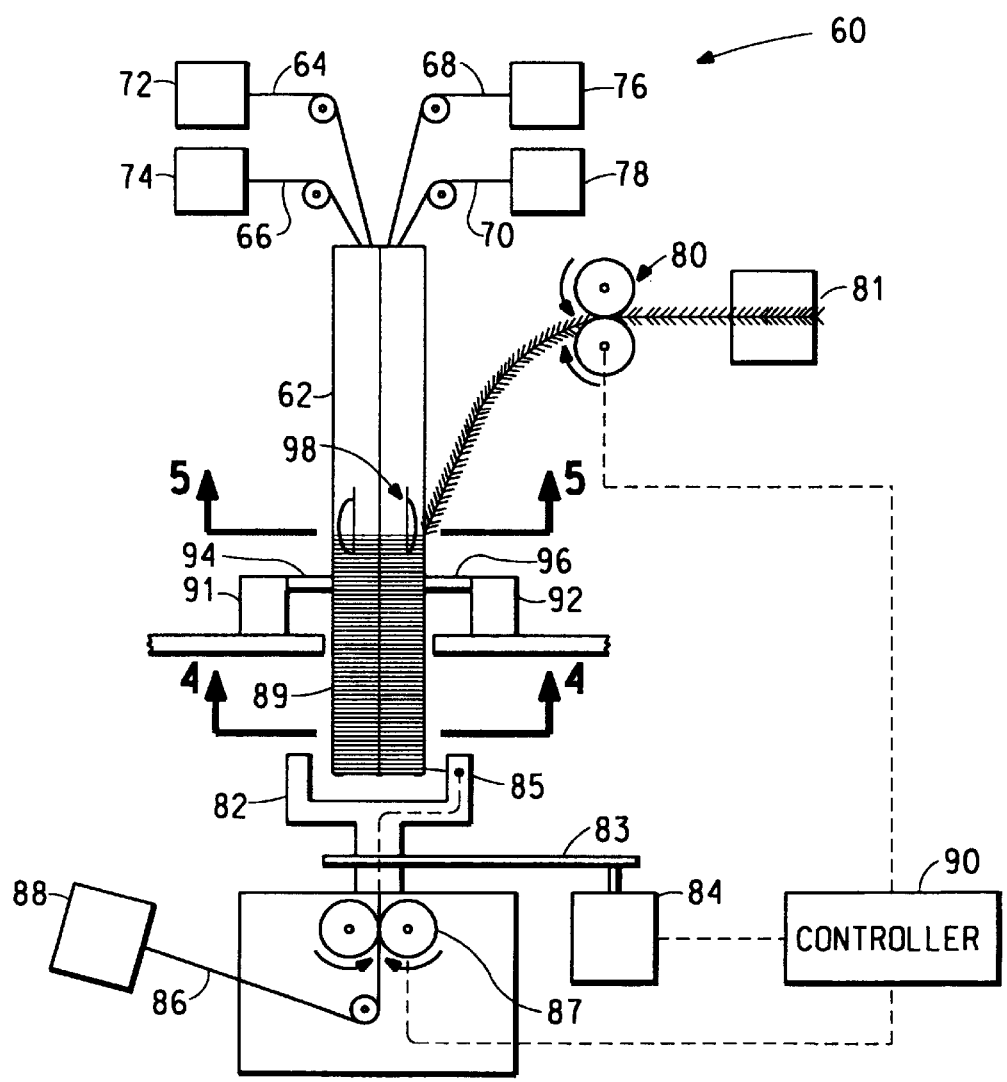
FIG. 3 is a side elevational view of an apparatus for making bristle sub-assemblies according to the present invention.

Referring to FIG. 3, an apparatus 60 for making elongated bristle sub-assemblies includes a stationary mandrel 62 having four substantially planar outer surfaces, an interior with at least one hollow passage, and open opposite axial ends. Four base strings 64, 66, 68 and 70 from four sources 72, 74, 76, and 78, respectively, are fed from the upper end of the mandrel 62, through the interior, and out the lower end.

At the lower end, the base strings are guided by guide pulleys (not shown) to run along respective grooves in the four outside corners of the mandrel in the upward direction. The base strings are caused to translate through the apparatus by servo drive rollers 80 and drive motor (not shown). A take-up mechanism 81 (only one illustrated) collects elongated bristle sub-assemblies for further processing or end use. Thus, the pulling force imparted by the servo drive rollers 80 pays out base strings from their respective sources and causes the base string to move axially downwardly through the mandrel and axially upwardly along the outside of the mandrel 62.

A rotor 82 driven by a motor 84 through a belt 83 is provided at the lower end of the mandrel 62. The rotor 82 has a hollow interior and a hollow arm 85 through which a monofilament 86 passes. The monofilament 86 is supplied from a source 88 and passes between pinch rollers 87. As the motor 84 rotates the rotor 82, the monofilament 86 is wrapped around the mandrel 62 to form a plurality of wraps 89 along the lower end of the mandrel 62. The upward translation of the base strings causes the wraps 89 to advance upwardly since the wraps are in frictional contact with the base strings.

A servo-circuit is established with the motor of the drive rollers 80, the motor of the pinch rollers 87 and the motor 84. A command from controller 90 dictates the speed of the drive rollers 80. Control signals from the controller 90 proportion the speed of the motor 84 and thus the rotational speed of the rotor 82, and the tension applied the monofilament during wrapping by controlling the speed of the pinch rollers 80 and 87. Any circuit and appropriate programming may be employed to ensure a desired throughput speed and number of wraps per inch on the mandrel.

The wraps pass beneath four ultrasonic heat sources mounted on each of the four corners of the mandrel. Only two of the four ultrasonic heat sources, 91 and 92, are shown in FIG. 3. The heat sources 91 and 92 include ultrasonic horns 94 and 96, respectively. The ultrasonic heat sources apply energy to the monofilaments that causes them to fuse with the respective base strings in a manner described more fully below. At a point spaced from the horns, a cutting device 98 cuts the monofilament 86 to thereby form a bristle sub-assembly as a continuous length of material that is taken up on a spool 81 or other means associated with the take up mechanism.

The base strings pass through tubes (not shown) provided in the interior of the mandrel 62. Proper positioning going into the tubes, and proper pay off from the supply sources, can be ensured by strategically located eyelets and/or pulleys, some of which are shown in FIG. 3. At the lower end of each tube, a pulley is provided to re-direct the respective base strings upwardly along the outer corners of the mandrel 62. The center lines of the axles for the pulleys are positioned appropriately so the strand leaves the groove of the respective pulleys aligned with the center line of the groove provided along the ridges or corners of the mandrel 62.

Although the embodiment of FIG. 3 shows four base strings and one monofilament, any number of base strings between one and four could be used. Also, the rotor could carry more than one monofilament so that several could be wrapped simultaneously.

The mandrel 62 is supported by a support frame (not shown) at the end opposite the rotor 82. Shorter mandrels are preferred, since longer mandrels have a greater moment arm, defined by the frame attachment point and the point at which the wrapping monofilament lays onto the mandrel and will wobble or oscillate as the wrapper pulls against the mandrel while laying the monofilament wraps on the mandrel face.

Figure 4:
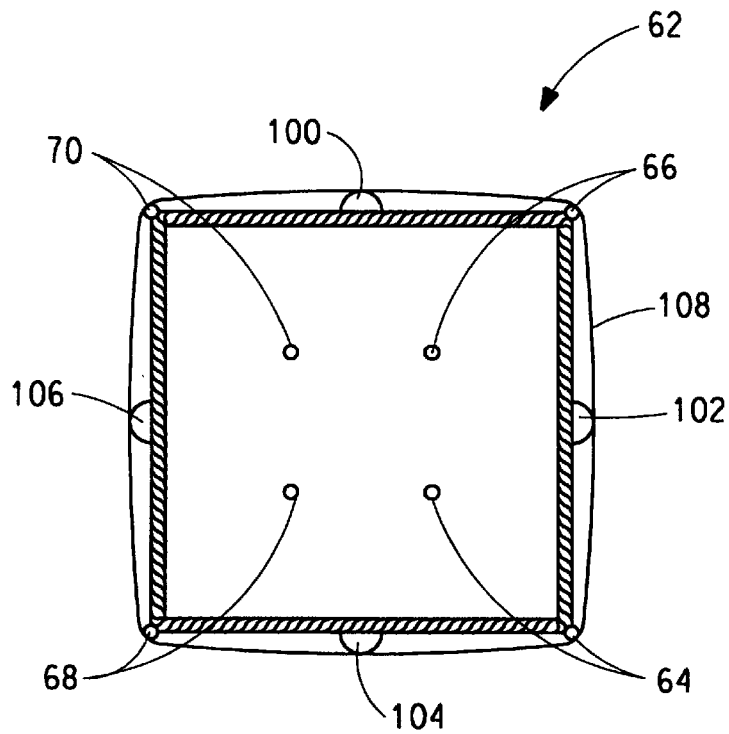
FIG. 4 is an enlarged transverse cross-sectional view taken along line 4—4 of FIG. 3.

As seen in FIG. 4, four shims 100, 102, 104, and 106 are provided axially on respective planar surfaces of the mandrel 62. The base strings 64, 66, 68, and 70 are shown in the interior of the mandrel 62, for their downward movement, and along respective corners of the mandrel 62 for their upward movement. A "wrap" 108 of monofilament is shown to contact the shims and the base strings simultaneously.

Each shim creates a ridge for the distance defined by the length of the shim in the plane defined between two corners of the mandrel. Spacers are placed under the shims to provide the desired relief from the surface plane of the mandrel. This desired relief is determined through experimentation and is a function of monofilament wrap density (wraps per inch), filament material (e.g., nylon, polyester, or polypropylene) and filament diameter. The shims are relatively short, permitting the wrapped monofilaments to fall off and relax as they are transported to the ultrasonic heat sources positioned just downstream from the shims and at each of the mandrel corners.

Figure 5:
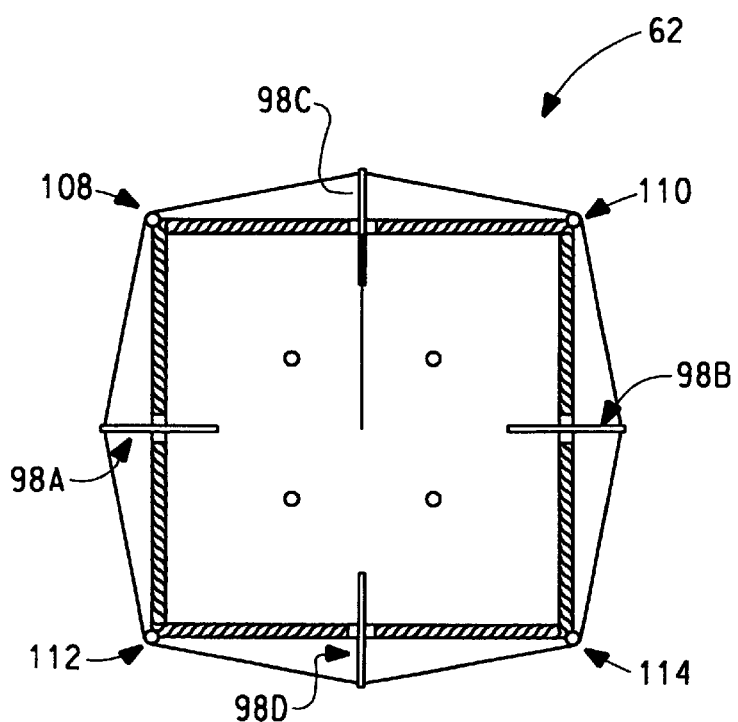
FIG. 5 is an enlarged transverse cross-sectional view taken along line 5—5 of FIG. 3.

As seen in FIG. 5, the cutter mechanism includes four rotating cutter wheels 98A, 98B, 98C, and 98D which cut each wrap 108 at four equi-spaced intervals. The wraps are cut after the monofilament is fused to the base strings by the ultrasonic horns. After cutting, four bristle sub-assemblies 108, 110. 112, and 114 are formed.

Figure 6:
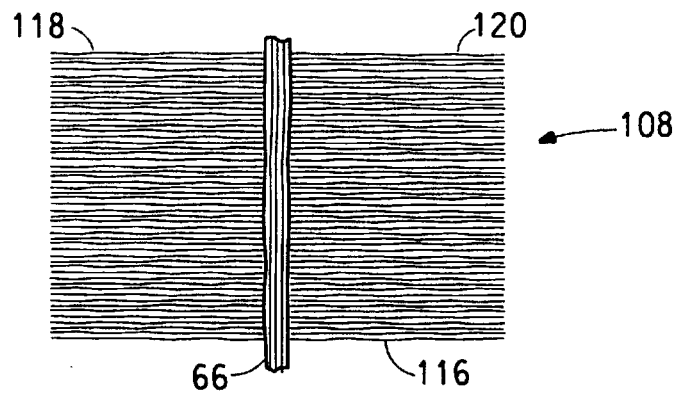
FIG. 6 is a top view of a bristle sub-assembly made according to the present methodology and using the apparatus of FIG. 3.
Figure 7:
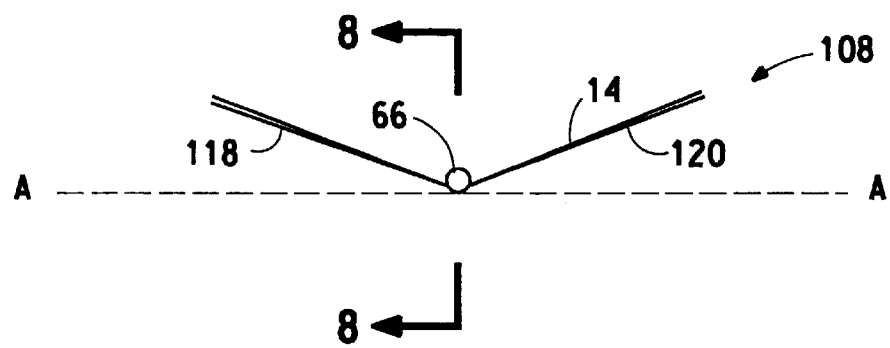
FIG. 7 is an end view of the bristle sub-assembly of FIG. 6.
Figure 8:
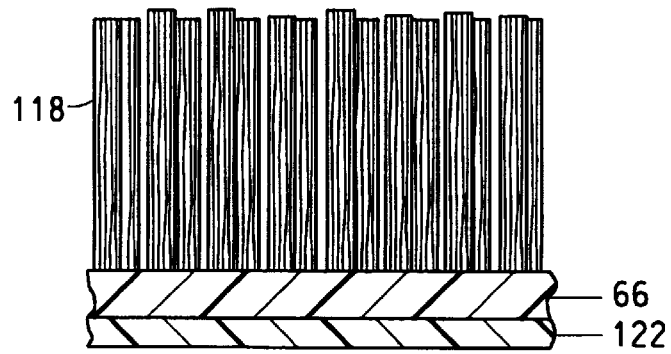
FIG. 8 is a longitudinal sectional view taken along line 8—8 of FIG. 7.

FIGS. 6–8 illustrate details of one bristle sub-assembly, such as bristle sub-assembly 108, which includes the base string 66 and a plurality of monofilament segments 116 connected to the base string 66. The monofilament segments 116 are preferably connected to the base string 66 substantially perpendicularly, as shown in FIG. 6, with the base string 66 dividing each monofilament segment 116 into first and second opposite side legs 118 and 120 which extend outwardly from the base string 66 in two rows. In the illustrated embodiment the legs 118 and 120 are of substantially equal length. Also, while the base string 66 is shown to be substantially normal or perpendicular to the monofilament segments 116, in other embodiments the monofilament segments could be placed at a variety of angles relative to the base string 66, depending on the brush characteristics desired for the finished product.

As seen in FIGS. 7 and 8, the legs 118 and 120 are acutely angled relative to the horizontal plane A—A to form a V-shaped structure. The polymeric monofilament segments 118 and 120 are substantially linear and flexible so that when deflected or bent, a spring restoring force is generated to return them to a linear or substantially linear disposition. The heat imparted by the ultrasonic horns provides a fusion zone 122 where the individual monofilament segments 118 and 120 are integrally connected to each other, if wrapped shoulder to shoulder or overlapping, and/or to the base string 66.

The monofilament used in the present invention may be made of several different thermoplastic polymeric materials, including aliphatic polyamides, aromatic polyamides, polyesters, polyolefins, styrenes, fluoropolymers, polyvinylchloride (PVC), polyurethane, polyvinylidene chloride, and polystyrene and styrene copolymers. Nylon is particularly suitable for several applications, and the following are examples of nylons that could be used: 6,12 nylon, 4 nylon, 6 nylon, 11 nylon, 12 nylon, 6,6 nylon, 6,10 nylon, 6,14 nylon, 10,10 nylon and 12,12 nylon and other nylon co-polymers. The base strings could be made of the same or similar materials as those used for the monofilament.

The monofilament used in the present invention is very different from the tufted, twisted multi-filaments used to make tuftstrings of the prior art. The differences in physical features changes the parameters for ultrasonic welding. Ultrasonic welding involves high frequency vibration energy. In general, a weld is generated at the interface between two thermoplastic monofilaments (or strings) as a result of frictional heating due to the excitation from the ultrasonic sources described above which are in contact with one or both of the individual strings.

Yarn strings, as used in the prior art for making flooring materials, comprises a bundle of individual filaments. As ultrasonic energy is applied to a yarn system of filaments, heat is generated at the interface of all contacting filament surfaces. The yarn bundle is therefore generating heat within the yarn bundle and at the interface between the yarn and the base string to which the attachment is desired. In contrast, for a monofilament, the heating is localized at the small surface area of the monofilament where contact is made between the base string and monofilament pair.

A typical yarn is comprised of many (usually 32–100 or more) filaments, each having an equivalent diameter of 4–23 denier per filament, and is often plied and/or twisted to form an even greater bundle of filaments. Therefore, under the ultrasonic horn surface of the prior tuftstring apparatus, a typical yarn will generate heat throughout the bundle of filaments. This heating causes significant deformation of yarn and individual filament structure and alteration of the characteristic properties of the yarn in the weldment area. In fact, the ability to distinguish the individual filaments comprising the yarn under where ultrasonic bonding has occurred is difficult and at times impossible.

A typical monofilament used in the present invention is 2–200 mils in diameter and is not plied or twisted to form bundles. When ultrasonically bonding a monofilament to the base string, the surface contact is limited to the small area where the wrap filaments and the base structure overlap and are compressed into each other under the pressure of the ultrasonic horn. The result is that ultrasonic heating becomes localized to the surface at the desired interface between the monofilaments and base strings. This small area surface heating and the relatively large mass of the monofilament as compared to the filaments in a yarn bundle, preserves much of the physical properties characteristic of the wrap monofilament prior to bonding. When controlled properly, the monofilament tufts are sufficiently strong so as not to be considered frangible.

Ultrasonic horns typical of those used in the tuftstring machine were tested for the preferred bristle article made of 6,12 nylon monofilament and were found to be problematic. The bonding end of these horns are configured with a radius designed to compress the yarn bundles and then bond the yarn filaments to the strand all within ½ inch of horn face. The bonding force, controlled by the pneumatic pressure regulated to an air cylinder of a flexure assembly (not shown), is distributed over the face of the horn. Some of the applied force is spent to overcome the spring-like forces in the matrix of the yarn bundle through the compression stage of the horn face. Once the fibers are compacted into intimate contact with one another, the remaining force is applied to transferring the ultrasonic energy to the fibers. This occurs in a very narrow zone at the longest tip of the horn.

The use of monofilaments in the present invention necessitates different ultrasonic heating conditions. First, the monofilaments are solid or essentially solid materials, for example, which need not be compacted to drive energy dissipating air out of the materials (they could be hollow core or lobed structures). Second, because the monofilaments are essentially solid material, and also because they often have circular cross-sections, the contact area between the wrap monofilament and the horn, as well as the wrap monofilament and the base strand, is very small. Assuming little or no compression, they are only tangentially in contact. The tuftstring horns performed unsatisfactorily since forces and ultrasonic energy were being concentrated in these tangential contact areas causing the wrapped monofilaments to be severed or as known in the art as "clipped."

Lower energy levels and lower bonding forces were found to overcome the clipping problem. At low energy levels, 20–25 watts, low bonding force, 7–8 psi air pressure, and line speeds of 2–3 yards per minute (ypm), bond strength of the wrap monofilament to the base strand was very low (0.10–0.20 lbs.) but clipping was eliminated. As line speeds were increased to 5 ypm, the operating window was lost. Bond strength deteriorated and any increase in bond force or bond energy or both generated clipping.

Figure 9:
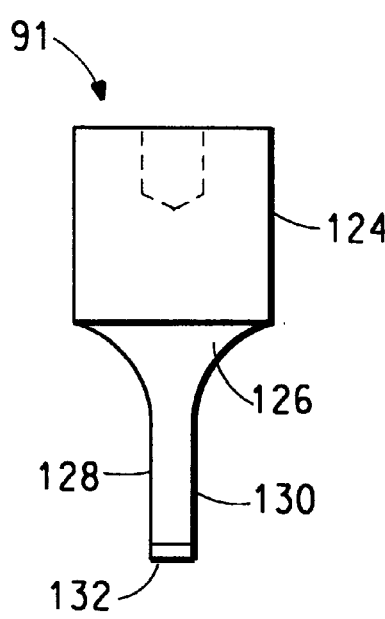
FIG. 9 is a side elevational view of an ultrasonic horn used in the apparatus of FIG. 7.
Figure 10:
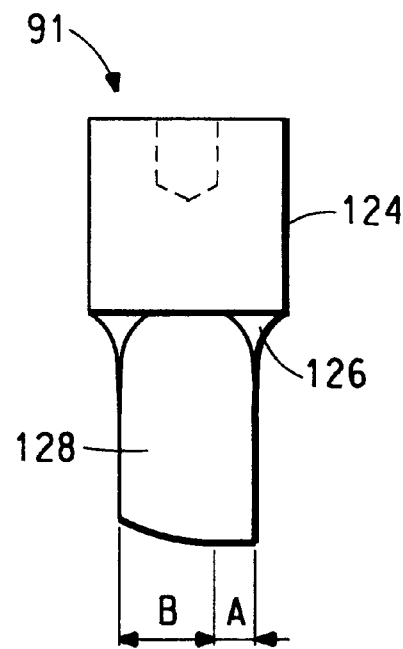
FIG. 10 is a side elevational view of the ultrasonic horn of FIG. 9 turned 90°.
Figure 11:
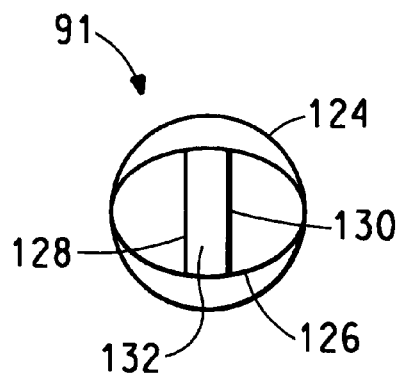
FIG. 11 is a bottom view of the ultrasonic horn of FIG. 9.

To solve these problems, the ultrasonic horns 91 and 92 (as well as the other two that are not shown in FIG. 3) were selected to have a specific geometry that provided two features. As seen in FIGS. 9–11, the horn 91 has a body portion 124 and a shank portion 126 which has two flat opposite side surfaces 128 and 130. An end face 132 has a flat portion defined by the length "A" and a radiused portion of length "B." Preferably, the length A is 0.25 inch, and the radiused portion has a length of about 0.50 inch. Also, the width of the face is 0.25 inch.

The horn 91 is particularly suitable for use with monofilaments, and differs from those used with tuftstrings in two significant ways. First, the flat portion represents about 33% of the face 132 of the horn 91, unlike the faces on tuftstring horns which are continuously curved. Second, the face 132 is significantly longer than for horns used optimally for tuftstring applications. These combine to provide greater surface contact area and better distribution of the forces and ultrasonic energy over a larger area. Unlike the chiseling effect of the horns typically used for tuftstring applications, the horn of FIGS. 9–11 distributes most of the force and energy over a 0.25 inch flat surface.

The horn 91 thus has a longer duration of contact and substantially uniform force with the monofilaments. By way of example, assuming the contact width for an 8 mil monofilament is equal to two times its diameter (with compression and partial melting), the surface area in contact can be estimated. For the ultrasonic horn 91, the contact area is 0.25 inch×0.008 inch (8 mils)×2=0.004 square inches.

For the ultrasonic horn typically used for the tuftstring applications, assuming there is sufficient force to compress the monofilament under the longest point of the horn, half its diameter or 0.004 inches. Contact will be made with 15 monofilaments assuming each of the monofilaments are in contact with each other in the plane of the strand. Ignoring the fact that each sequential trailing monofilament will be compressed less and therefore have a smaller footprint, the surface area in contact is generously estimated as 0.126× 0.008×2=0.0002 square inches. Thus, the long duration ultrasonic horn 91 distributes the bonding force and energy over 20 times the area of the horn typically used in tuftstring applications. This greater area enables increased bristle sub-assembly production rate up to 5 ypm beyond the capability of tuftstring horns.

In general, bonding conditions are defined by the several variables. For a given combination of strand and monofilament wrap, the primary variables are power (watts of energy delivered to the material passing under the horn), bonding force determined in this case by the pneumatic pressure supplied to an air cylinder (not shown) associated with each of the ultrasonic sources, ultrasonic amplitude, and stop gap setting.

When the monofilament wraps are shoulder-to-shoulder, as seen in FIGS. 6–8, the interconnection of adjacent monofilaments 116 to each other in flow zone 122 may be relatively strong compared to the interconnection of the base string to the flow zone 122 which is substantially composed of monofilament material. This feature allows, in some applications, the removal of the base string from the monofilaments anytime after thermal fusing. Alternatively, the adhesion between the monofilaments and the base string can be equally as strong as the adhesion between monofilaments.

The monofilament wraps 89 seen in FIG. 3 can be disposed in a single row, shoulder-to-shoulder, or the density can be varied such that the adjacent monofilaments do not touch each other. Also, the density may be such that a second or greater number of rows of monofilaments are stacked upon each other. Where eight (8) mil nylon monofilament is used, for example, a density of about 125 monofilaments per inch of base string can be achieved with a single row, shoulder-to-shoulder monofilaments.

Figure 12:
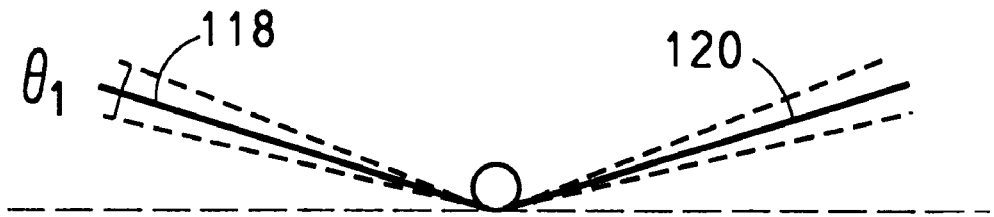
FIG. 12 is an end view of a bristle sub-assembly of the present invention and showing the band angle of variance for the bristles of a given row as $\theta_1$.

Referring to FIG. 12, the monofilament legs 118 and 120 are acutely angled relative to the horizontal plane. The legs are each generally disposed in a linear array or row having a band angle $\theta_1$ of relatively small deviation. Experiments have shown that $\theta_1$ varies between about 3 and about 10 degrees for 6,12 nylon of 8 mil diameter; between about 5 and about 10 degrees for 6,12 nylon of 6.7 mil diameter; and between about 1 and 12 degrees for 6 nylon of 8 mil diameter.

Figure 13:
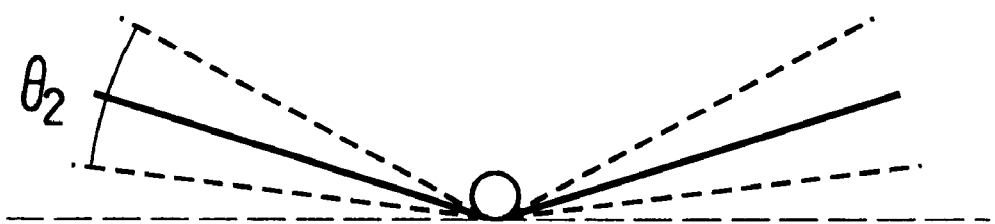
FIG. 13 is an end view of a multifilament tuft string of the prior art and showing the band angle of variance for the tufts of a given row as $\theta_2$.

In contrast, yarns used in the manufacture of floor coverings have larger angular deviations as shown in FIG. 13 (the "legs" in FIG. 13 representing an approximate center line for a thickened multifilament). Experiments have shown that this angle, $\theta_2$, ranges between 12 and 35 degrees for 1375 denier, 2-ply multifilament nylon. This substantial difference is likely due to the inability to precisely control the thermal history of each filament within the bundle, forming a wider range of heat set properties in the bond area and greater loss of position memory. In addition, the dense packing compresses the bundled filaments, creating forces on adjacent yam filaments to displace them, further contributing to the angular displacement.

The monofilaments used in the present invention have elongation features that are significantly different from those of the tuftstring multifilaments. The apparatuses described herein and also in the aforementioned tuftstring apparatus operate at tensions ranging lower than 100 grams. At that level, a thirty-six inch strand of multifilament nylon having a 1375 denier diameter and a 2-ply construction elongates by about 11%, whereas monofilament 6,12 nylon having an 8 mil diameter elongates by less than 1%. This property was identified as being critical in early development of the process, requiring tension control changes and shim modifications.

The guiding, processing and winding of elongated or continuous bristle subassemblies made according to the present invention, having a significant composition of monofilaments, is greatly improved from those of yarns or yams with a very low monofilament count. Monofilaments, being noticeably more rigid than a yam or yarn-like bundle of filaments, act like springs or arms and are an aid to controlling the orientation of the structure after formation of the individual elongated pile articles. Operability is significantly enhanced and equipment complexity is reduced in delivering the elongated bristle sub-assemblies through subsequent processes (if any) and to its final package form.

The stiffness of monofilaments is also a significant factor with regard to the process of wrapping the filaments around the mandrel and transporting the ladder structure on the mandrel. Textile yams or strings are very pliable and will easily wrap and conform to the straight line, point to point, comers of a structure such as a mandrel. This is not so with monofilaments which have a stiffness factor as defined by the following equation:

$$\text{Stiffness}=\alpha D_f^4$$

where $\alpha$ is a constant and $D_f$ is filament diameter. The higher stiffness of the monofilaments used herein creates high forces at the comers of the mandrel which, if not compensated for, will stall the transport of the ladder due to the excessively high friction of the base string along the length of the mandrel to the cutter mechanism.

To overcome this situation, the shims were configured in the wrapping section of the mandrel to displace the monofilament from the mandrel while it is layered onto the mandrel surface during wrapping, the shims are short and terminate just beyond the wrapping section to permit slack in the monofilament wraps, thus lowering the friction between the backbone strands and the mandrel.

Together with the shims, the wrap tension is closely controlled so as not to excessively elongate (stretch) the monofilament during the wrapping process. When excessive tension and elongation is generated, the elastic memory of the monofilament causes the monofilament to shrink to a new equilibrium state, but not a relaxed state, as it transports off of the shims, where it places cumulative forces on the base string until they can no longer transport.

Some sample operating parameters for the apparatus of FIG. 3 are provided as follows: for polymeric base strings and monofilaments, line speed is 5 ypm, wraps per inch are 30 wraps/inch, and the rotor speed is 5,400 rpm.

Figure 14:
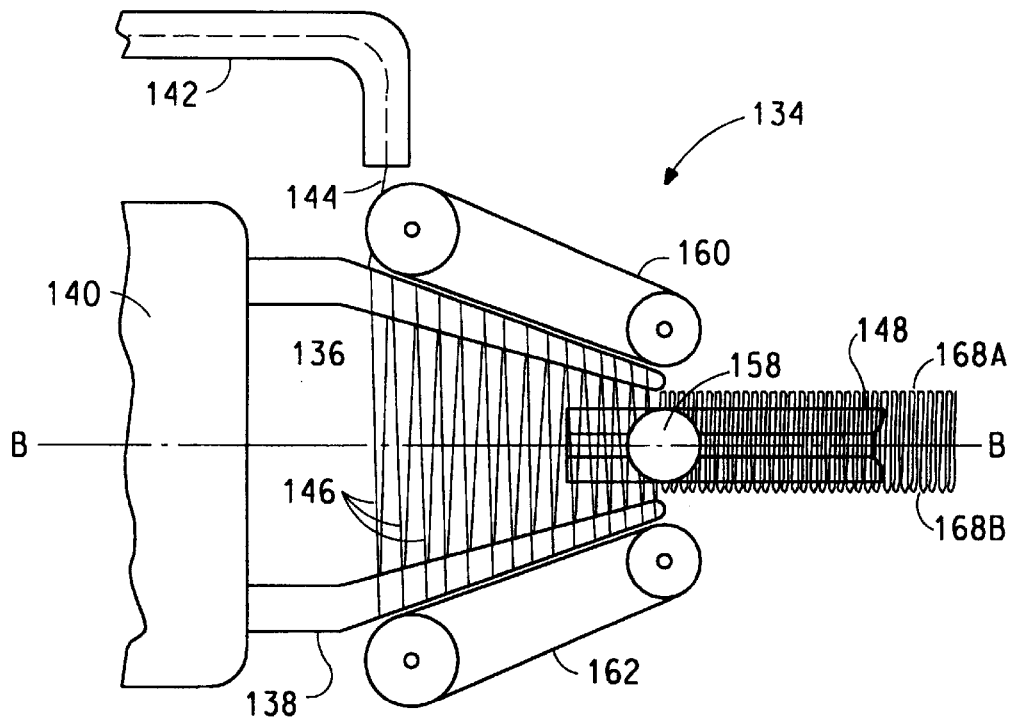
FIG. 14 is a top, partial view of an apparatus for making looped monofilament bristle sub-assemblies according to another embodiment of the present invention.
Figure 15:
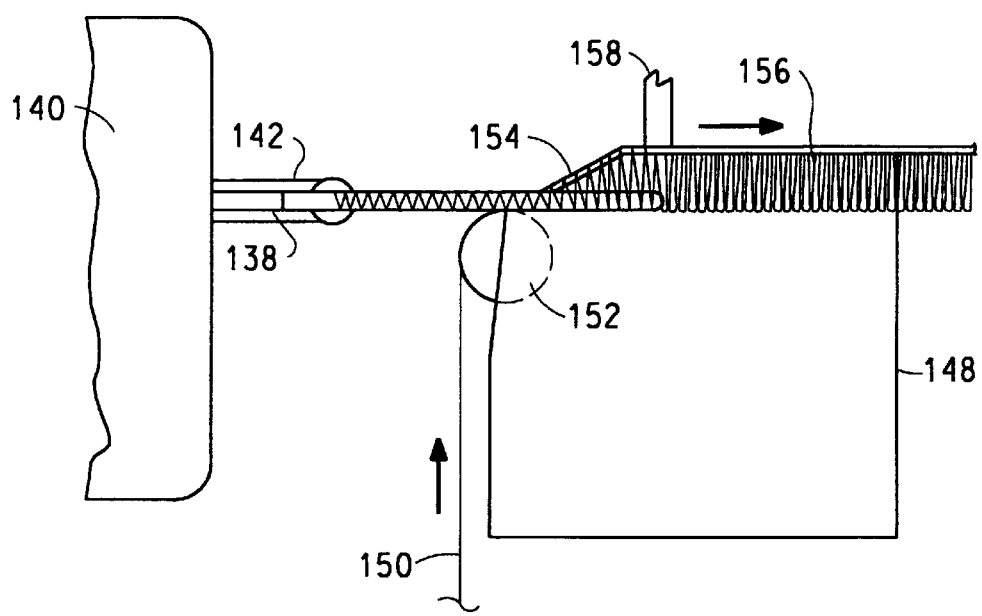
FIG. 15 is a side view of the apparatus of FIG. 14.

Referring now to FIGS. 14 and 15, an apparatus 134 according to another embodiment of the present invention makes looped monofilament sub-assemblies. The apparatus 134 includes converging supports 136 and 138 which extend outwardly from, and are fixedly mounted on, a substantially stationary base 140. The base 140 is supported by the wrapper mechanism 142 suing bearings and magnetic fields to prevent rotation. An arm of the wrapper mechanism 142 rotates about an axis "B" to pay out a monofilament 144 around the supports 136 and 138 to thereby form a plurality of wraps 146.

An anvil 148 is juxtaposed the distal end portions of the supports 136 and 138 on the B axis. A base string 150 supplied from a source (not shown) passes over a guide pulley 152 and is directed into a guiding groove provided in a sloped forward surface 154 and upper flat surface 156 of the anvil 148. The slope and relative position of the forward surface 154 is selected to form a sufficient angle between the base string and the loop ends which maintains the sequence of crossing monofilament while passing under an ultrasonic horn 158. The slope of surface 154 and the angle of convergence for the two supports 136 and 138 are matched so as to maintain tension across wraps 146. Drive belts 160 and 162 assist in transporting the monofilament loops 146 toward the horn 158.

Figure 16:
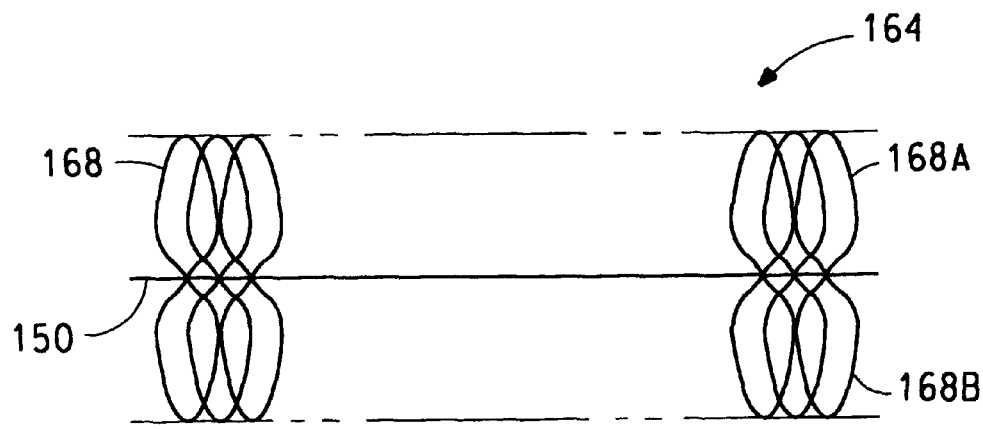
FIG. 16 is a top view of a looped monofilament bristle sub-assembly made with the apparatus of FIG. 14.
Figure 17:
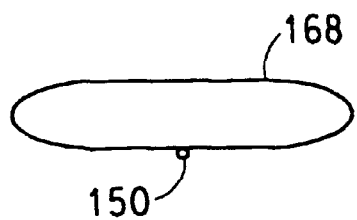
FIG. 17 is an end view of one of the monofilament loops formed with the apparatus of FIG. 14.
Figure 18:
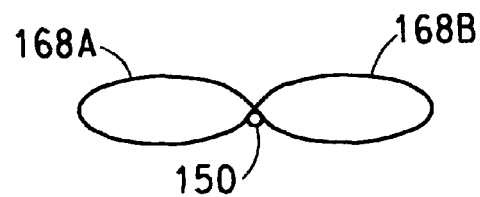
FIG. 18 is an end view of the monofilament loop of FIG. 17 after ultrasonic heating.

A looped monofilament bristle sub-assembly made by the apparatus of FIGS. 14 and is shown in FIGS. 16–18. The bristle sub-assembly 164 includes a base string 150 and a plurality of continuously looped monofilaments 168. The looped monofilaments 168 are formed by taking the single strand of monofilament 144 and forming a plurality of "ovals" along the length of the base string 150. As each oval moves under the horn 158 it is compressed to form "figure eights" and is then bonded by ultrasonic welding to the base string 150 so as to bisect the oval and create two individual loops which provide first and second legs 168A and 168B on opposite sides of the base string 150. The legs 168A and 168B extend outwardly and symmetrically or non-symmetrically from the base string in two rows.

In the embodiments employing a looped monofilament, it is preferable to make the length of the loop legs (such as 168A and 168B) substantially greater than the maximum width of the loop legs. It is also preferable that the monofilament strand is bonded to the base string at the point where the legs of each loop intersect the base string, so that a continuous length of looped bristle sub-assembly can be cut into segments without causing unraveling of the loops. While not preferred, the bond point may be at other locations.

The monofilaments used in any of the above embodiments may be co-extrusions of one or more polymers. Also, to achieve the desired physical characteristics of the bristles, it has been found that the preferred monofilaments are those having a diameter of 2 to 200 mils, and preferably 2 to 20 mils. In a particularly preferred embodiment for the toothbrush, the monofilaments are 6–10 mils in diameter. Monofilaments of different diameters and/or colors can be combined in one bristle assembly or sub-assembly to achieve specific brushing characteristics and/or appearance. For the base string, a monofilament having a diameter of 2 to 200 mils can be used, and in particular, 20 to 30 mils.

In embodiments using nylon for either the monofilament or the base string, or both, a preferred nylon filament is sold under the name TYNEX®, and is manufactured by E.I. Du Pont De Nemours and Company of Wilmington, Del. USA. TYNEX® is a 6,12 nylon filament made from polyhexamethylene dodecanamide. It has a melting point of between 208 and 215° C. and has a specific gravity of 1.05–1.07, and is available commercially in many shapes and diameters.

Monofilaments and/or base strings suitable for use in the present invention can have shapes other than circular cross-sections, and may be hollow or have voids in their cross-section. Embodiments described above show circular cross-sectional shapes for the base string and monofilaments. Either or both the base string and monofilaments could have oval or other shapes. In any shape, the preferred thicknesses for the base string and monofilaments are selected to provide a level of functionality to the individual brush applications.

With respect to the base string, the preferred embodiments described above show a single strand of monofilament material. However, the base string could be a bundle of monofilaments having at least one of the monofilaments made of polymeric thermoplastic material.

The polymeric monofilaments used for bristles in the various embodiments described above can have other additives. For example, the polymeric monofilaments could include 0–50% by weight particles having functional and/or aesthetic quality. One example would be particulate material that provides a color feature that would enhance the visual appearance of the bristles. Other functional particles could also be included such as anti-microbial additives in the polymeric monofilaments. Other particulate materials or coatings may be applied to or embodied within the monofilament such as therapeutic agents or colorants, or other desirable additives. Also, the monofilaments may be surface treated to provide desired properties, such as to alter the frictional coefficient.

The embodiments described above require "connection" between the monofilaments and the base string. In this context, "connection" means that the monofilaments are attached to the base string by a frangible joint formed by melting, adhesive bonding, solvent bonding, or similar means. The degree of frangibility can be controlled so that, if desired, the base string can be easily separated from the monofilaments after bonding.

Figure 19:
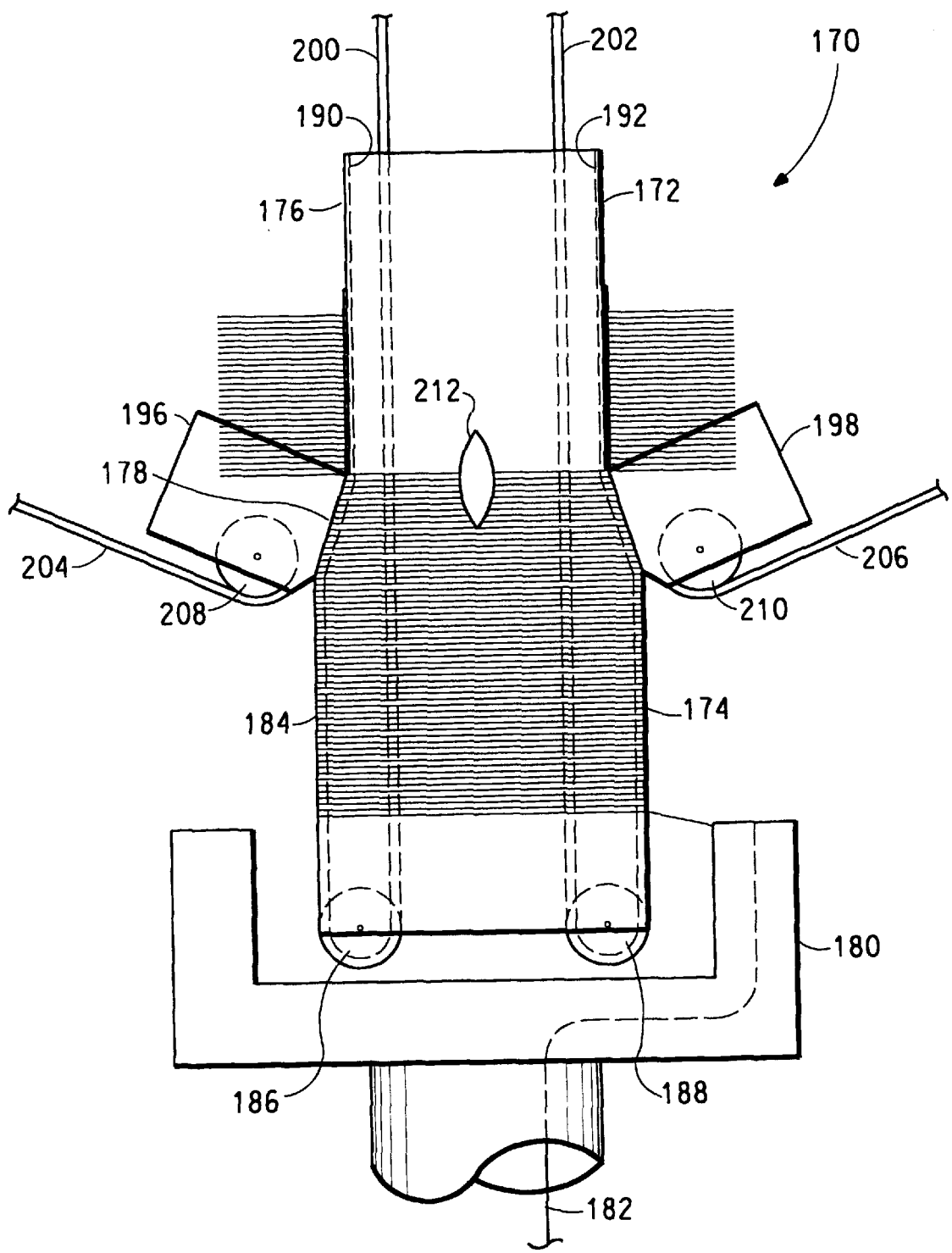
FIG. 19 is a side elevational view of an apparatus for making bristle sub-assemblies according to another embodiment of the present invention.

FIG. 19 illustrates apparatus 170 for making bristle sub-assemblies in which heat fusion of monofilaments is avoided. In this embodiment, a mandrel 172 has a rectangularly shaped lower portion 174, a rectangularly shaped upper portion 176, and a tapered, medial portion 178. The lower portion 174 is wider than the upper portion 176. The medial portion 178 provides a transition zone between the upper and lower portions.

Figure 20:
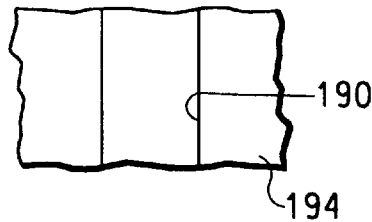
FIG. 20 is an enlarged, partial side view showing detail of one of the string guide grooves of the apparatus of FIG. 19.

At the lower end of the mandrel 172, a rotor 180 is caused to rotate by a drive motor (not shown). The rotor 180 is hollow to receive at least one monofilament 182 supplied from a source (not shown). As the rotor 180 rotates, the monofilament 182 wraps around the lower portion 174 of the mandrel 172 to form a plurality of wraps 184. A pair of pulleys 186 and 188 are disposed at the lower end of the mandrel 172. The pulleys 186 and 188 are in alignment with respective grooves 190 and 192 provided longitudinally on the opposite sides of the mandrel 172. FIG. 20 shows groove 190 in side 194 of the mandrel 172.

The mandrel 172 is positionally fixed by mounting to an appropriate frame structure (not shown). A pair of interlocking guides 196 and 198 are positioned next to respective grooves 190 and 192 at the medial portion 178 of the mandrel 172. Two monofilament base strings 200 and 202 are fed downwardly into the mandrel from sources (not shown). The base strings 200 and 202 pass over pulleys 186 and 188, respectively, and are thereby re-directed upwardly into respective grooves 190 and 192.

Two monofilament locking strings 204 and 206 are fed to the interlocking guides 196 and 198, respectively, from sources (not shown). Pulleys 208 and 210 provided respectively on the interlocking guides 196 and 198 re-direct the locking strings 204 and 206 towards the grooves 190 and 192. As the base strings 200 and 202 transport the wraps 184 upwardly, the interlocking guides 196 and 198 force the locking strings together with respective base strings, to thereby lock or sandwich the wraps between the locking strings and the base strings. Once locked together, a slitter 212 provided on opposite sides of the mandrel 172 (only one of which is shown) cuts the wraps 184 causing them to spring outwardly and form two bristle sub-assemblies having a two-part base string and a plurality of generally straight monofilament segments. The taper of the medial portion 178 is established to coincide with the length of monofilament 182 accumulated in the groove 214 by the interlocking of locking string 204 into base string 200.

Figure 21:
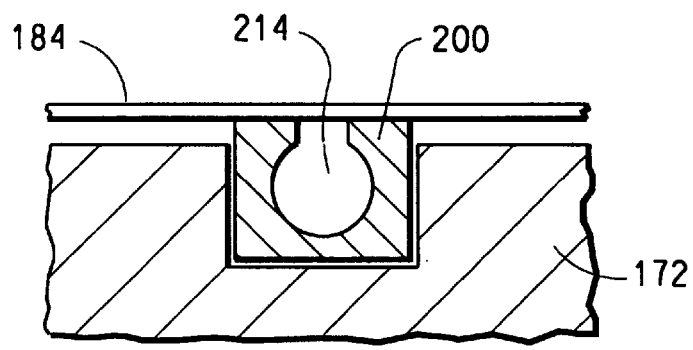
FIG. 21 is an enlarged, partial cross-sectional view showing detail of the base string residing in the groove with a wrap of monofilament overlying the groove.
Figure 22:
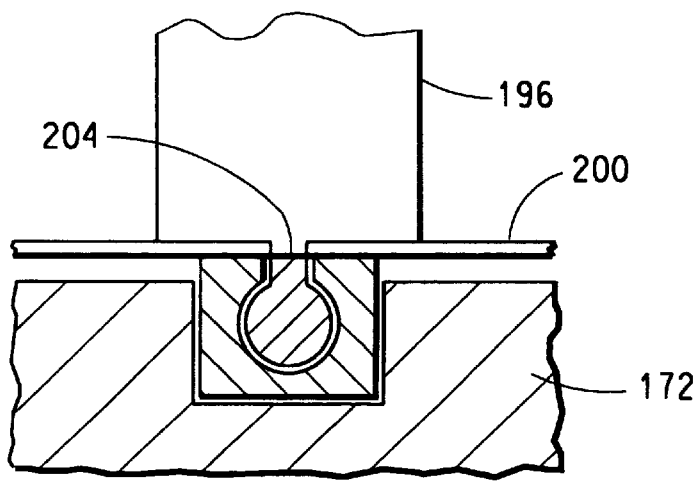
FIG. 22 is a view similar to FIG. 21, showing the locking string being pressed into the groove of the base string.

As seen in FIGS. 21 and 22, the wraps 184 (one visible) are wrapped around the mandrel 172. In FIG. 21, the base string 200 has a groove 214 which is open at the top and runs the length of the mandrel 172. The wraps 184 cross over the open top, and when they pass under the interlocking guide 196, the locking string 204 is pressed into the groove 214 thus locking the wrap 184 between the two strings, as shown in FIG. 22.

Any appropriate shape of the groove 214 and complementary shape of the string 204 can be provided to ensure mechanical interlocking of the two strings. This mechanical interlock is achieved by using polymeric materials that are resilient to permit passage of the upper string into the groove of the lower string. After the two strings are interfitted and the wraps cut by the slitter, the monofilaments will bend upward to form two rows of legs as in the other embodiments. The two base strings are disposed respectively below and above the monofilaments and in alignment with each other and thus interlock with each other to capture the monofilaments therebetween.

The bristle sub-assemblies made according to FIGS. 19–22 preferably use the materials described in the previous embodiments, along with additional non-thermoplastic and non-polymeric materials that may be used in the absence of heat, adhesive, or solvent fusion.

In the various embodiments described herein, the non-looped monofilaments have been described as linear and parallel. It is possible to use polymeric monofilaments that are non-linear, however, such as in the case of monofilaments that have been crimped wavy or otherwise conditioned to a predisposed non-linear formation.

Although the invention has been described with reference to several particular embodiments, it will be understood to those skilled in the art that the invention is capable of a variety of alternative embodiments within the spirit and scope of the appended claims.

What is claimed is:

1. A method for making an elongated bristle sub-assembly comprising the steps of:

providing at least one base string;

wrapping a first monofilament strand around the base string to produce a number of monofilament wraps per length of base string, the first monofilament strand being made of a bristle material;

bonding the monofilament wraps to the base string; and cutting the monofilament wraps to thereby form at least one row of monofilament bristles connected to the base string.

2. A method according to claim 1, wherein the step of bonding the monofilament wraps includes applying ultrasonic energy to an area where the monofilament wraps contact the base string, the ultrasonic energy being applied at a level and for a time sufficient to at least partially melt the monofilament wraps.

3. A method according to claim 1, wherein the step of providing at least one base string includes providing a mandrel and feeding the at least one base string along an exterior of the mandrel.

4. A method according to claim 3, wherein the wrapping step comprises wrapping the single monofilament strand around the mandrel to form the plurality of monofilament wraps, each monofilament wrap being in contact with the base string at substantially a single point.

5. A method according to claim 1, wherein the step of feeding the at least one base string includes providing a mandrel having a polyhedron shape and a plurality of corners, and feeding the at least one base string along one of the corners of the mandrel.

6. A method according to claim 5, wherein the mandrel has four sides and four corners, and the feeding step includes feeding four base strings through the mandrel and exteriorly along respective ones of the corners.

7. A method according to claim 1, wherein the step of providing the at least one base string includes feeding the base string along an exterior surface of a mandrel, and the wrapping step comprises wrapping the singe monofilament strand around the mandrel so that each of the monofilament wraps contacts the base string at substantially a single point.

8. A method according to claim 1, further comprising the step of wrapping at least a second monofilament strand around the base string simultaneously while wrapping the first monofilament strand to produce an additional number of monofilament wraps per length of base string, the second monofilament strand being made of a bristle material.

9. A method according to claim 1, wherein at least one of the base string and the first monofilament strand is made of a polymeric material.

10. A method according to claim 9, wherein the polymeric material is a thermoplastic polymeric material.

11. A method according to claim 1, wherein at least one of the base string and the first monofilament strand is made of a material selected from the group consisting of aliphatic polyamides, aromatic polyamides, polyesters, polyolefins, styrenes, polyvinylchloride (PVC), fluoropolymers, polyurethane, polyvinylidene chloride, polystyrene, styrene copolymers, and co-extrusions of at least one polymer.

12. A method according to claim 1, wherein at least one of the base string and the first monofilament strand is made of a nylon material.

13. A method according to claim 12, wherein the nylon material is selected from the group consisting of 4 nylon, 12 nylon, 6,10 nylon, 6,12 nylon 6,14 nylon, 10,10 nylon, and 12,12 nylon.

14. A method according to claim 1, wherein at least one of the base string and the first monofilament strand is made of polybutylene terephthalate (PBT).

15. A method according to claim 1, wherein at least one of the base string and the first monofilament strand has a non-circular cross-sectional shape.

16. A method according to claim 1, wherein at least one of the base string and the first monofilament strand has at least one continuous cavity.

17. A method according to claim 1, wherein at least one of the base string and the first monofilament strand has a plurality of non-continuous voids.

18. A method according to claim 1, wherein the base string is a monofilament made of thermoplastic material having a diameter of 2–200 mils.

19. A method according to claim 1, wherein at least one of the first monofilament strand and the base string has a substantially circular cross-sectional shape.

20. A method according to claim 1, wherein the base string has a non-circular cross-sectional shape.

21. A method according to claim 1, wherein the base string is a bundle of monofilaments, at least one of which is made of a thermoplastic, polymeric material.

22. A method according to claim 21, wherein the at least one monofilament included in the bundle is made of material selected from the group consisting of aliphatic polyamides, aromatic polyamides, polyesters, polyolefins, styrenes, polyvinylchloride (PVC), fluoropolymers, polyurethane, polyvinylidene chloride, and polystyrene and styrene copolymers.

23. A method according to claim 1, wherein the first monofilament strand includes an additive selected from the group consisting of abrasives, colorants, color particles, therapeutic agents, anti-microbial agents, and combinations thereof.

24. A method according to claim 23, wherein the additive is included in an amount of 0–50% by weight.

25. A method according to claim 23, wherein the additive is an abrasive selected for their abrasive properties from the group consisting of oxides, carbides, silicates, nitrides, boronitrides, borides, and metals.

26. A method according to claim 1, further comprising surface treating the first monofilament strand.

27. A method according to claim 1, wherein the bonding step comprises heat fusing the monofilament wraps to the base string.

28. A method according to claim 1, wherein the bonding step comprises adhesively bonding the monofilament wraps to the base string.

29. A method according to claim 1, wherein the bonding step comprises solvent bonding the monofilament to the base string.

30. A method according to claim 1, wherein the monofilament has a diameter of 2 to 200 mils.

31. A method according to claim 1, wherein the bonding step comprises passing the wraps under an ultrasonic heat source which includes a horn having at least a partially flat face.

32. A method according to claim 1, wherein the first monofilament strand has a diameter of 2 to 20 mils.

* * * * *